J. FLEISCHMANN.
HOT WATER HEATER.
APPLICATION FILED AUG. 11, 1919.
1,351,899.
Patented Sept. 7, 1920.
2 SHEETS—SHEET 1.
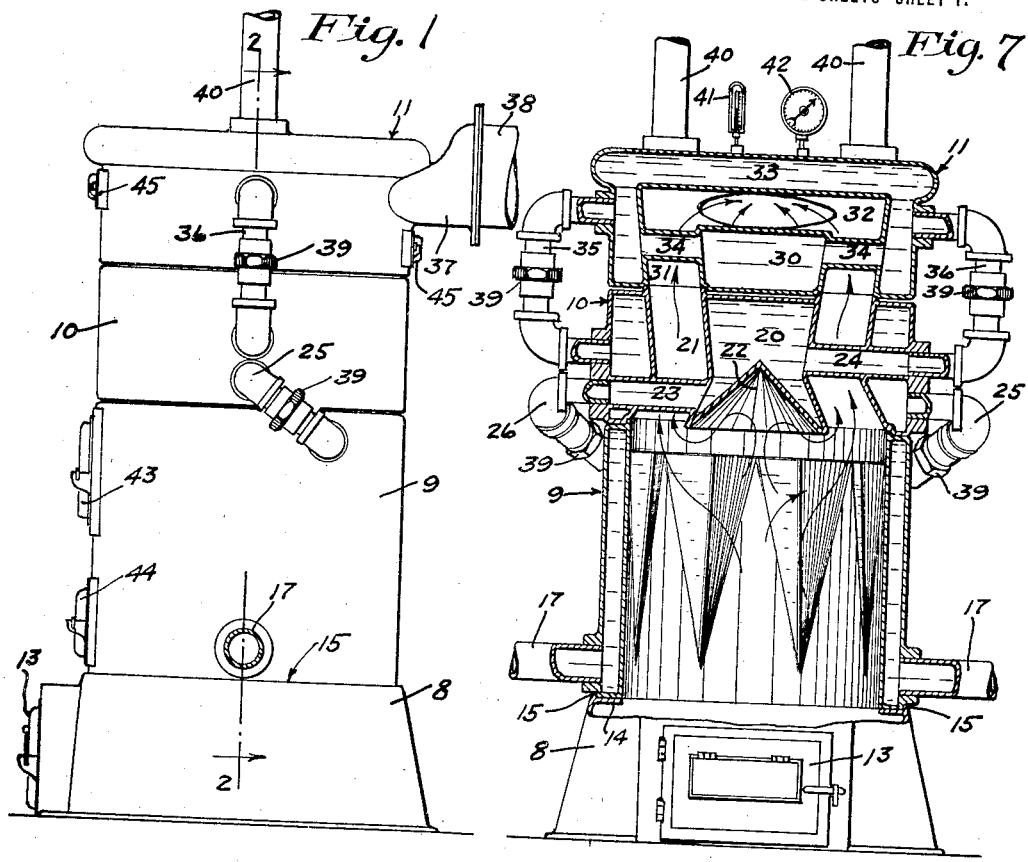
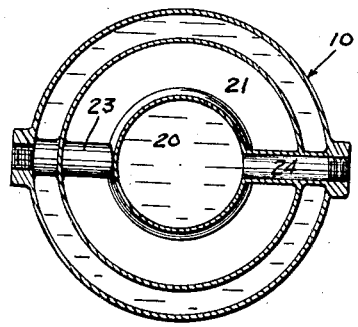
Inventor
John Fleischmann
By his Attorneys J. FLEISCHMANN.
HOT WATER HEATER.
APPLICATION FILED AUG. 11, 1919.
1,351,899.
Patented Sept. 7, 1920.
2 SHEETS—SHEET 2.
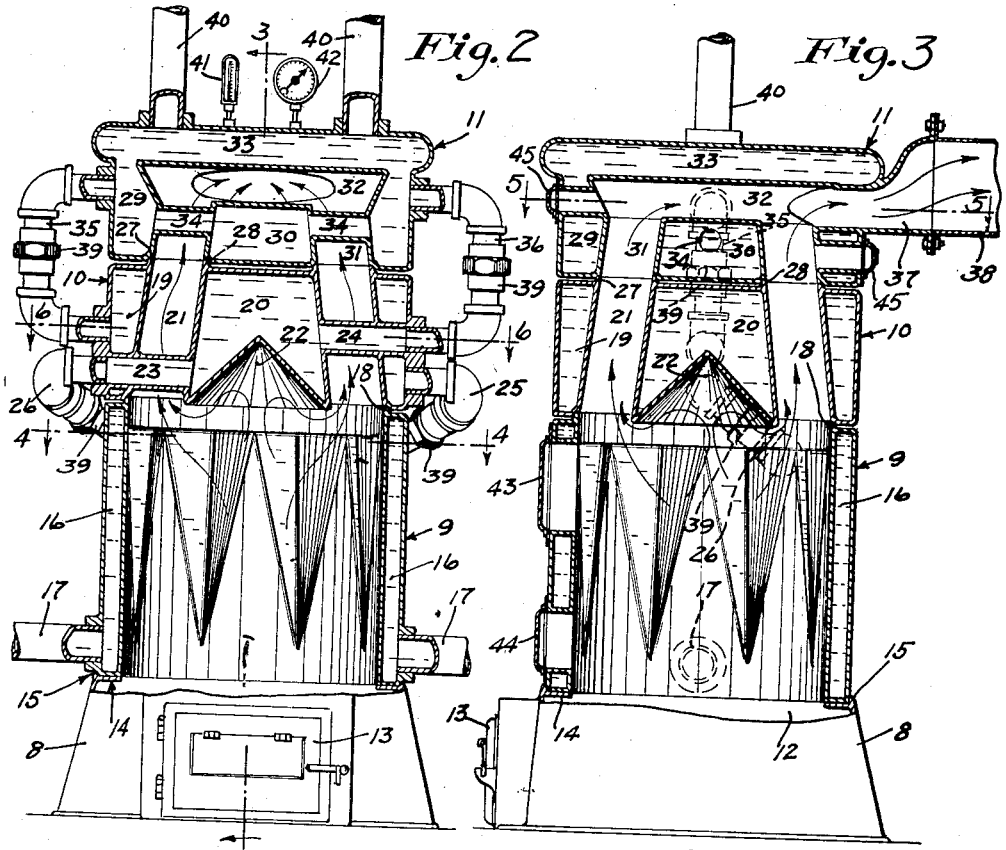
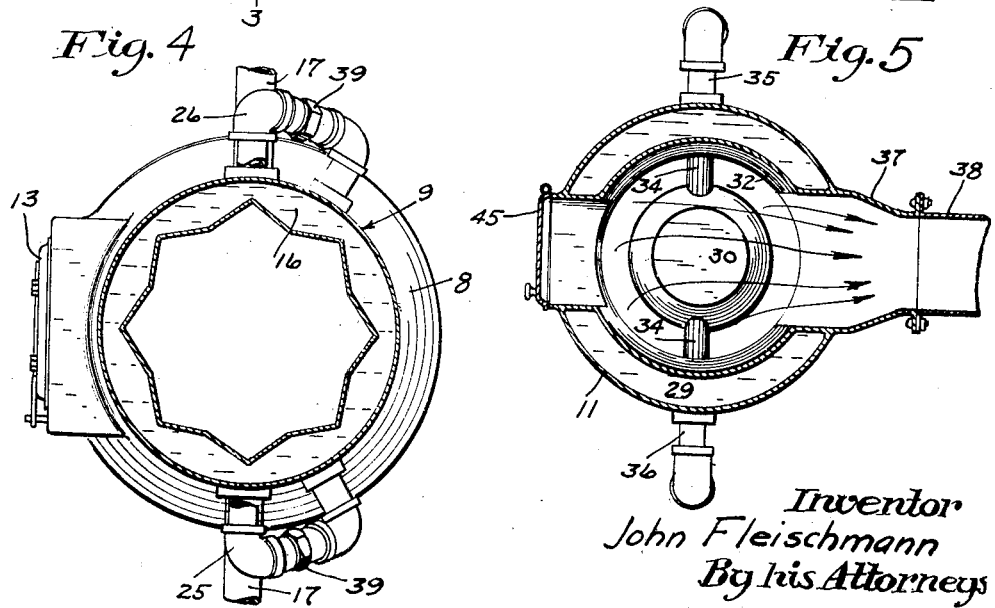
Inventor
John Fleischmann
By his Attorneys

UNITED STATES PATENT OFFICE.

JOHN FLEISCHMANN, OF MINNEAPOLIS, MINNESOTA.

HOT-WATER HEATER.

1,351,899.      Specification of Letters Patent.     Patented Sept. 7, 1920.

Application filed August 11, 1919. Serial No. 316,531.

*To all whom it may concern:*

Be it known that I, JOHN FLEISCHMANN, a citizen of the United States, residing at Minneapolis, in the county of Hennepin and State of Minnesota, have invented certain new and useful Improvements in Hot-Water Heaters; and I do hereby declare the following to be a full, clear, and exact description of the invention, such as will enable others skilled in the art to which it appertains to make and use the same.

My invention relates to improvements in hot water heaters for heating systems, and has for its primary object to increase the efficiency of such heaters with a minimum amount of fuel.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:—

Figure 1 is a right side elevation of the improved hot water heater;

Fig. 2 is a view principally in vertical section taken on the line 2—2 of Fig. 1;

Fig. 3 is a view principally in vertical section taken on the line 3—3 of Fig. 2;

Fig. 4 is a horizontal section taken on the line 4—4 of Fig. 2;

Fig. 5 is a horizontal section taken on the line 5—5 of Fig. 3;

Fig. 6 is a horizontal section taken on the line 6—6 of Fig. 2, with some parts broken away; and Fig. 7 is a view corresponding to Fig. 2, but showing a slight modification.

The improved hot water heater includes a base section 8, a fire pot section 9, an intermediate section 10, and a top or dome section 11. The base section 8 affords an ash pit 12 and is provided with a damper-equipped ash door 13. On the top of the base section 8 is an inturned horizontal flange 14 on which the fire pot section 9 rests, and outward of this flange is a vertical flange 15 which surrounds said section 9 and holds the same against horizontal movement on the flange 14.

The fire pot section 9 includes inner and outer concentric walls spaced to afford a water chamber 16 that is closed at its top and bottom. Two diametrically opposite cold water return pipes 17 have screw-threaded engagement with bossed openings in the outer wall of the fire pot section 9 and open into the water chamber 16 at the bottom thereof. To increase the heating surface of the inner wall of the fire pot section 9, the same is circumferentially corrugated. These corrugations are V-shaped in length and the points or lower ends thereof terminate substantially in the same horizontal plane with the centers of the cold water return pipes 17, and the upper ends of said corrugations terminate short of the upper end of the water chamber 16. The grate for the heater, not shown, will be located in the fire pot section 9 at the bottom thereof. On the upper end of the fire pot section 9 is a short vertical flange 18 which forms a continuation of the inner wall of the water chamber 16.

The intermediate section 10 loosely rests on top of the fire pot section 9 and is held against horizontal movement thereon by the flange 18, which extends into an annular seat in the bottom of said intermediate section. This intermediate section 10 also has inner and outer walls circumferentially spaced to afford therebetween a water chamber 19. Concentric with the water chamber 19 is a central water chamber 20, the wall of which is spaced apart from the inner wall of the water chamber 19 to afford an auxiliary combustion chamber 21 which is open at its top and bottom. Both water chambers 19 and 20 are closed at their tops and bottoms and it is important to note that the bottom of the central water chamber 20 is of conical form and extends upward into the chamber 20 to afford a smoke trap 22.

A water conduit 23 leads from a bossed opening in the left side of the outer wall of the intermediate section 10 and extends through the water chamber 19, auxiliary combustion chamber 21, and opens into the central water chamber 20 at the bottom thereof. Leading from the central water chamber, at substantially midway between the top and bottom thereof, is a water conduit 24 which extends through the auxiliary combustion chamber 21, water chamber 19, and a bossed opening in the right side of the outer wall of the intermediate section 10.

The water chamber 16, in the fire pot section, has communication with the water chamber 19 in the intermediate section 10 through a pipe 25 on the right side of the heater, and said chamber 16 also has communication with the central water chamber in said intermediate section 10 through a pipe 26 on the left side of the heater and the conduit 23. The receiving ends of the pipes 25 and 26 have screw-threaded engagement with bossed openings in the outer wall of the water chamber 16 at the top thereof, and the delivery end of the pipe 25 has screw-threaded engagement with a bossed opening in the outer wall of the water chamber 19 at the bottom thereof, while the delivery end of the pipe 26 has screw-threaded engagement with the outer end of the conduit 23. On the top of the intermediate section 10 are concentric flanges 27 and 28 which form extensions of the inner walls of the water chamber 19 and the wall of the water chamber 20, respectively.

The top or dome section 11 loosely rests on the top of the intermediate section 10 and is held against horizontal movement thereon by the flanges 27 and 28, which fit in annular seats in the bottom of said section. This top section 11 has an outer water chamber 29, a central water chamber 30, an auxiliary combustion chamber 31, a smoke chamber 32, and a top water chamber 33. The central water chamber 30 is closed at its top and bottom and located directly over the central water chamber 20. The auxiliary combustion chamber 31 is located between the inner wall of the water chamber 29 and the wall of the water chamber 30, and forms an extension or continuation of the auxiliary combustion chamber 21, and the smoke chamber 32 is located above the top of the water chamber 30 and extends outward over the auxiliary combustion chamber 31 which opens therein. The water chamber 33 is located between the top of the top section 11 and the top of the smoke chamber 32.

A circulation of water between the water chambers 29 and 30 is obtained through a pair of diametrically opposite and horizontally alined conduits 34 which extend through the auxiliary combustion chamber 31. The water chamber 19 has communication with the water chamber 29 through a pipe 35, the ends of which have screw-threaded engagement with bossed openings in the outer left-hand walls of the sections 10 and 11. The central water chamber 20 also has communication with the water chamber 29 through the conduit 24 and a pipe 36, one end of which pipe has screw-threaded engagement with the bossed outer end of the conduit 24, and the other end of which pipe has screw-threaded engagement with a bossed opening in the outer wall of the top section 11.

A short horizontal smoke pipe section 37 leads from the smoke chamber 32, at the back of the heater, and a smoke pipe 38 is bolted to the outer end thereof. Each pipe 25, 26, 35 and 36 is provided with a union 39 which detachably connects the sections thereof. These pipes 25, 26, 35 and 36 not only afford communicated passageways for the circulation of water, but afford means for detachably connecting the several sections of the heater and hold the same in assembled relation. Two diametrically opposite hot water pipes 40 lead from bossed openings in the top of the dome section 11. A thermometer 41 and an altitude gage 42 are secured to the top of the dome section 11. In the front of the fire pot section 9 and extending through the water chamber 16, is a fuel opening normally closed by a fuel door 43. Also formed in the front of the fire pot section 9 and extending through the water chamber 16 is a clinker opening normally closed by a door 44. Front and rear cleanout openings 45, normally closed by suitable doors, extend through the water chamber 29 and open the former into the smoke chamber 32, and the latter into the auxiliary combustion chamber 31. The rear cleanout opening 45 may also be used as a check draft and is located directly below the smoke pipe section 37.

In assembling the sections of the heater, asbestos or other suitable material may be used to seal the joints therebetween, and the several sections of the heater and the pipes will, of course, be covered with a suitable insulating material. To increase the capacity of the heater, intermediate sections may be interposed between the present intermediate and top sections. It will be noted that the top of the smoke chamber 32 is extended to increase the heating surface thereof, and the side wall thereof is tapered upwardly and outwardly. In Figs. 2 and 3, the walls of the auxiliary combustion chamber 31—32 are shown as converging upwardly into said smoke chamber, and in Fig. 7 said walls upwardly diverge into the smoke chamber. The conduits 23 and 24 are shown as cast integral with the intermediate section 10 and the conduits 34 are cast integral with the top section 11. The trap 22 retards the movement of the smoke for a sufficient length of time to permit the same to be consumed before entering the auxiliary combustion chamber.

It is, of course, understood that the improved heater is equally well adapted for use in steam or vapor systems, and, when used for steam, the sections of the heater may be made from steel or other suitable metal that will withstand the required steam pressure, and when used in hot water systems, cast metal is preferably used.

The improved heater is especially adapted to burn soft coal.

What I claim is:—

1. A water heater including fire pot, intermediate and top sections, each of which has an outer water chamber, said intermediate section also having a central water chamber spaced apart from its outer water chamber to afford a secondary combustion chamber, water conduits connecting the outer water chamber in the intermediate section to the water chambers in the fire pot and top sections, and other water conduits connecting the central water chamber of the intermediate section to the water chambers of the fire pot and top sections, said conduits being in the form of union equipped pipes located outward of the heater and separably connecting the fire pot and intermediate and top sections, and holding the same in assembled relation.

2. A water heater including fire pot, intermediate and top sections, each of which has an outer water chamber, said intermediate section also having a central water chamber spaced apart from its outer water chamber to afford a secondary combustion chamber, water conduits connecting the outer water chamber in the intermediate section to the water chambers in the fire pot and top sections, and other water conduits connecting the central water chamber of the intermediate section to the water chambers of the fire pot and top sections, said central water chamber having an inwardly projecting conical bottom affording a smoke trap, said conduits being in the form of union equipped pipes located outward of the heater and separably connecting the fire pot and intermediate and top sections, and holding the same in assembled relation.

3. A hot water heater including fire pot, intermediate and top sections, each of which has an outer water chamber, said intermediate and top sections also having central water chambers spaced apart from their outer water chambers to afford a secondary combustion chamber, water conduits connecting the outer water chamber in the intermediate section to the outer water chambers in the fire pot and top sections, other water conduits connecting the inner water chamber of the intermediate section to the outer water chambers in the fire pot and top sections, and communicating water passageways between the outer and central water chambers in the top sections, said conduits being in the form of union equipped pipes located outward of the heater and separably-connecting the fire pot and intermediate and top sections, and holding the same in assembled relation.

4. A hot water heater including fire pot, intermediate and top sections, each of which intermediate and top sections, each of which has an outer water chamber, said intermediate and top sections also having central water chambers spaced apart from their outer water chambers to afford a secondary combustion chamber, a smoke chamber overlying the secondary combustion chamber and the central water chamber of the top section, a water chamber overlyng the smoke chamber and communicating with the outer water chamber of the intermediate section, two water conduits leading from the central water chamber of the intermediate section and extending through the secondary combustion chamber and the outer water chamber of said intermediate section, water pipes connecting one of said water conduits to the outer water chamber of the fire pot section and connecting the other of said conduits to the outer water chamber of the top section, other water pipes connecting the outer water chamber of the intermediate section to the outer water chambers in the fire pot and top sections, and communicating water passageways between the central and outer water chambers of the top section, said water pipes being provided with unions for separably connecting the fire pot and intermediate and top sections, and holding the same in assembled relation.

5. A hot water heater including fire pot, intermediate and top sections, each of which has an outer water chamber, said intermediate and top sections also having central water chambers spaced apart from their outer water chambers to afford a secondary combustion chamber, a smoke chamber overlying the secondary combustion chamber and the central water chamber of the top section, a water chamber overlying the entire smoke chamber and communicating with the outer water chamber of the intermediate section, two water conduits leading from the central water chamber of the intermediate section and extending through the secondary combustion chamber and the outer water chamber of said intermediate section, water pipes connecting one of said water conduits to the outer water chamber of the fire pot section and connectng the other of said conduits to the outer water chamber of the top section, other water pipes connecting the outer water chamber of the intermediate section to the outer water chambers in the fire pot and top sections, communicating water passageways between the central and outer water chambers of the top section, and a horizontal smoke outlet leading from the smoke chamber, said water pipes being provided with unions for separably connecting the fire pot and intermediate and top sections, and holding the same in assembled relation.

In testimony whereof I affix my signature in presence of two witnesses.

JOHN FLEISCHMANN.

Witnesses:
    WINIFRED I. WARD,
    HARRY D. KILGORE.